(12) United States Patent
Kaplan

(10) Patent No.: US 6,386,605 B1
(45) Date of Patent: May 14, 2002

(54) CANINE WASTE COLLECTION DEVICE AND DISPOSAL METHOD

(76) Inventor: Michael Kaplan, 4461 Kensington Park Way, Lake Worth, FL (US) 33467

( * ) Notice: Subject to any disclaimer, the term of this patent is extended or adjusted under 35 U.S.C. 154(b) by 0 days.

(21) Appl. No.: 09/739,368

(22) Filed: Dec. 19, 2000

(51) Int. Cl.[7] .............................. A01K 29/00; E01H 1/12
(52) U.S. Cl. ...................................................... 294/1.5
(58) Field of Search ........................... 294/1.1, 1.3–1.5, 294/55; 248/99; 15/257.1, 257.3; 119/161, 867

(56) References Cited

U.S. PATENT DOCUMENTS

| | | | |
|---|---|---|---|
| 3,358,647 A | * 12/1967 | Wilson ........................ | 119/169 |
| 4,010,970 A | 3/1977 | Campbell | |
| 4,019,767 A | 4/1977 | Niece | |
| 4,121,866 A | 10/1978 | Schall et al. | |
| 4,156,400 A | * 5/1979 | Migdal ........................ | 119/161 |
| 4,191,414 A | 3/1980 | Dameron | |
| 4,221,415 A | 9/1980 | Ganz | |
| 4,341,410 A | * 7/1982 | Summach ..................... | 248/99 |
| 4,705,310 A | 11/1987 | Scripter | |
| 4,962,956 A | 10/1990 | Scripter | |
| 5,269,575 A | * 12/1993 | Parvaresh .................... | 294/1.5 |
| 5,971,452 A | 10/1999 | Marymar et al. | |
| 6,123,046 A | * 9/2000 | Gemeniano .................. | 119/161 |

* cited by examiner

*Primary Examiner*—Dean J. Kramer
(74) *Attorney, Agent, or Firm*—Tom Hamill, Jr.

(57) ABSTRACT

A canine waste collection appliance and waste disposal method are disclosed. The collection appliance includes a handle connected to a frame. The frame includes a right portion, a left portion and an end portion. The right portion includes a proximal end and a distal end. The left portion includes a proximal end and a distal end. An end portion is provided intermediate the distal end of the right portion and the distal end of the left portion. The end portion includes a thin slot thereon. A paper element, such as a paper towel would be partially threaded through the thin slot and folded about the end portion. The paper towel would be also folded about the right portion and the left portion and the excess paper towel would be wound about the connection of the handle with the right portion and the left portion. The dog, in preparation for defecation, rounds its back, then squats and defecates. Prior to the defecation, the appliance is placed on the ground to permit the waste to fall into the paper towel held thereon. The paper towel is released from the appliance and the waste and the used paper towel may be flushed down a toilet. In this case the waste material would be dumped from the paper towel into the toilet bowl followed by the paper towel. By flushing the toilet the waste and paper towel would be disposed of in a simple and environmentally friendly manner. Alternatively, the paper towel and waste may be disposed of in a conventional manner.

5 Claims, 4 Drawing Sheets

CANINE WASTE COLLECTION DEVICE AND DISPOSAL METHOD

BACKGROUND OF THE INVENTION

1. Field of the Invention

The present invention relates generally to a canine waste collection device used for collecting excrement and the like, including a paper towel supported thereon. The invention also relates to the loading and release of the paper towel from the appliance. The invention further relates to the disposal of the used paper towel and the waste material.

2. Description of the Prior Art

Devices to assist in the cleanup of canine waste are known. An example of such a device is U.S. Pat. No. 4,221,415 which shows a canine waste disposal apparatus having pivotally connected first and second frame elements for retaining a disposable sanitation sheet.

Another such device is U.S. Pat. No. 4,121,866 which shows a device to facilitate the picking up and disposing of animal feces comprising a handle which is connected to a ring shaped supporting device having an enlarged aperture therein, a plastic bag to be inserted through the enlarged aperture.

The foregoing prior art indicates that it is known to use devices to assist in the clean up and disposal of canine waste. However, none of the prior art contemplates the unique structural configuration of the instant invention. The unique structure combined with the ease of sanitary use gives the instant invention advantages over the prior art. Other advantages of the present invention over the prior art also will be rendered evident.

SUMMARY OF THE INVENTION

The present invention provides a canine waste collection appliance and waste disposal method. The collection appliance includes a handle connected to a frame. The frame includes a right portion, a left portion and an end portion. The right portion includes a proximal end and a distal end. The left portion includes a proximal end and a distal end. An end portion is provided intermediate the distal end of the right portion and the distal end of the left portion. The end portion includes a thin slot thereon. A paper element, such as a paper towel would be partially threaded through the thin slot and folded about the end portion. The paper towel would be also folded about the right portion and the left portion and the excess paper towel would be wound about the connection of the handle with the right portion and the left portion. The dog, in preparation for defecation, rounds its back, then squats and defecates. Prior to the defecation, the appliance is placed on the ground to permit the waste to fall into the paper towel held thereon.

The paper towel with the feces located thereon is released from the appliance in the following manner. With the appliance on the floor, the right corner of the paper towel and the left corner of the paper towel are brought together over and about the central area (where the feces is located). Then the third corner of the paper towel which is located about the handle of the appliance is brought into contact with the right corner and the left corner of the paper towel. The first, second and third corners of the paper towel, when held, would then form a pouch with the feces there within. The three corners of the paper towel are raised about 12 inches off the ground with a first hand. At this point, the appliance will fall downward, and with the other hand, the user would pull the appliance forward and under the pouch. This pulls the remaining corner of the paper towel from the slot on the appliance, releasing the last corner of the paper towel. This fourth corner of the paper towel would then be placed with the other corner elements of the paper towel, and the used towel covering the waste is ready to be disposed. By using this method, the waste is confined to the paper towel without coming into contact with the person using the appliance.

At the point where the paper towel is released from the appliance, it is ready to be disposed. A preferred manner of disposal includes flushing the feces and the used paper towel down a flush toilet. In this case the waste material would be dumped from the paper towel into the toilet bowl followed by the paper towel. The toilet is prevented from clogging by separating the feces from the paper towel. By using the toilet to dispose of the feces and the used paper towel, one does not need to store the waste in a waste can or trash can until the trash is picked up. This avoids odors and other sanitary issues.

One of the main structures of the invention is the slot located on the end portion. The slot secures the paper towel to the appliance without the use of springs, clamps or other complicated securing means. The slot anchors the paper towel in a secure, tight position. The manner that the paper towel is affixed to the frame of the appliance prevents waste from coming into contact with the appliance per se. This is advantageous as it keeps the appliance clean and sanitary. Further, the manner that the paper towel is affixed to the frame permits the waste, and subsequently the paper towel, to be disposed of in a completely sanitary and simple fashion. By disposing of the waste in this manner, no feces remain on the grass or road. Further, there are no plastic bags to dispose of, which minimizes odor and the storage of such waste material until it is ultimately taken to a landfill.

It has been contemplated that the appliance may be constructed from metal, plastic, wood or combinations thereof. Additionally, the term paper towel is used herein to denote the paper towels which may be obtained commercially under any of a host of brand names. In one embodiment of the invention, a paper towel which measures about 11 inches by 13 inches may be used. However, it is to be understood that any sheet material with the appropriate strength, flexibility, and dimensions may be employed with the appliance. If the material employed does not break down or loose structural integrity when wetted, it should not be flushed down the toilet.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is an object of the present invention to provide a canine waste collection device and disposal method which includes a handle and frame, the frame including means to removably secure a paper towel or the like thereto.

It is an object of the present invention to provide a canine waste collection device and disposal method wherein the waste may be dumped into a toilet and the used paper towel subsequently thrown in to the toilet wherein by flushing the toilet the waste and soiled paper towel are disposed of.

It is an object of the present invention to provide a canine waste collection device and disposal method to provide a slot on the end portion, the slot being perpendicular to the handle, the slot designed to receive a corner of a paper towel there through.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a canine waste collection appliance and waste disposal method embodying the principles and concepts of the present invention will be described.

Figure 1:
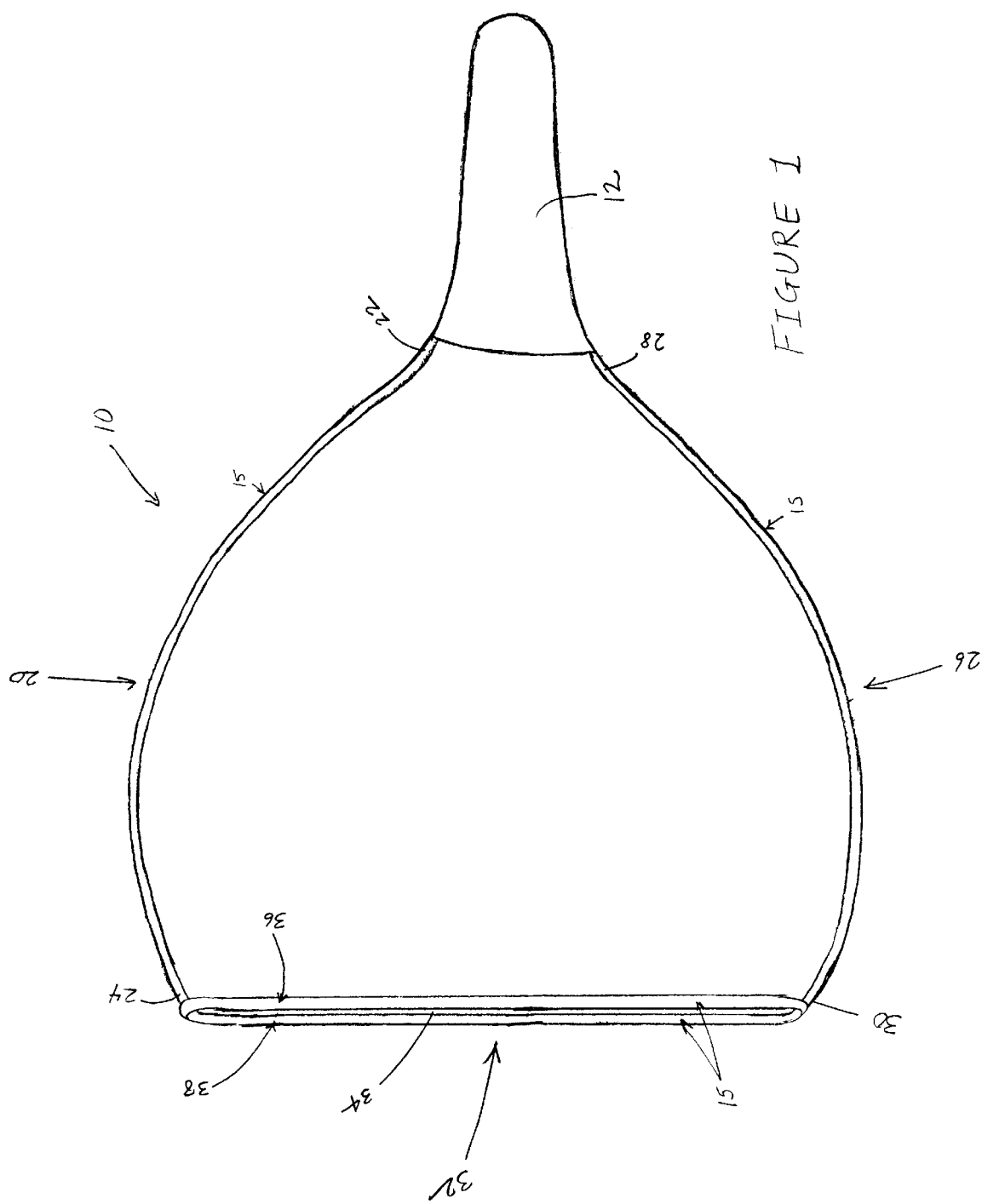
FIG. 1 is a view showing the canine waste collection device sans paper towel.

FIG. 1 shows a canine waste collection appliance 10. The canine waste collection appliance 10 includes a handle 12 connected to a frame 15. The frame 15 includes a right portion 20 and a left portion 26. The right portion 20 includes a right portion proximal end 22 and a right portion distal end 24. The left portion 26 includes a left portion proximal end 28 and a left portion distal end 30. An end portion 32 is provided intermediate the right portion distal end 24 and the left portion distal end 30. The end portion 32 includes a thin slot 34 which generally traverses the length of the end portion 32. The thin slot 34 is defined as the opening intermediate the end portion upper member 36 and the end portion lower member 38.

Figure 2:
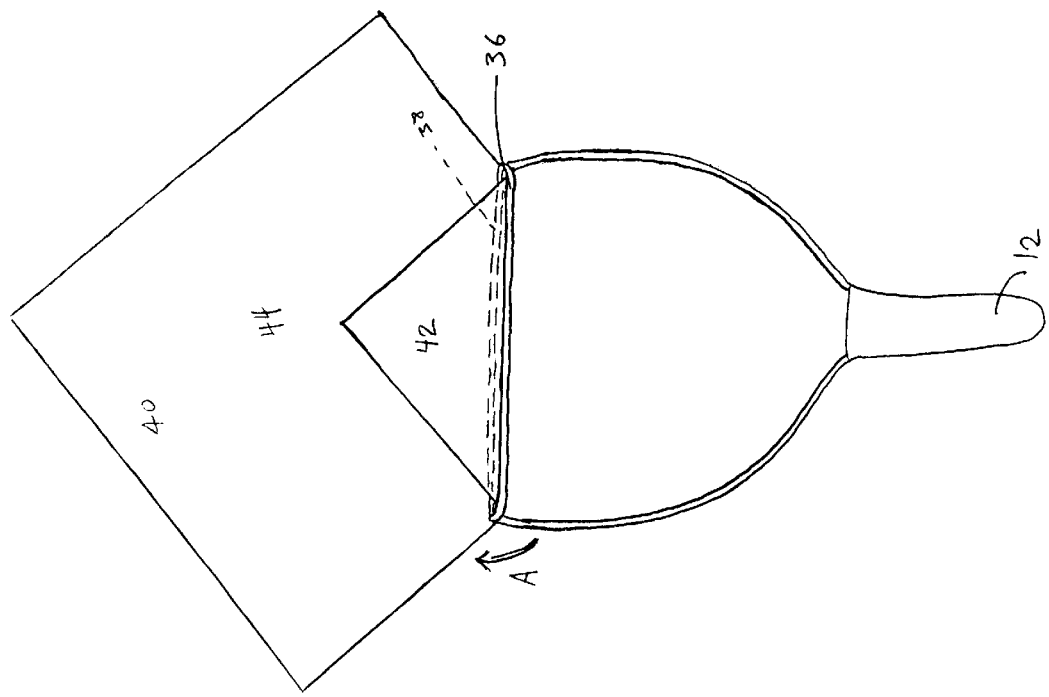
FIG. 2 is a view showing the first step of the process of loading a paper towel onto the canine waste collection device.

The frame 15 and handle 12 may constructed of wire, wood, plastic or any other material which has the appropriate material properties FIGS. 2–6 demonstrate the loading of the paper towel 40 into the appliance 10. Referring now specifically to FIG. 2, the first step of loading the paper towel 40 into the appliance 10 is shown. A first portion 42 of the paper towel 40 is threaded through the thin slot 34, leaving a generally triangular portion (first portion 42) remaining above the thin slot 34. The remaining portion 44 the paper towel 40 is designated as 44. Therefore, when you combine the remaining portion 44 with the first portion 42 you would have the entire paper towel 40.

Figure 3:
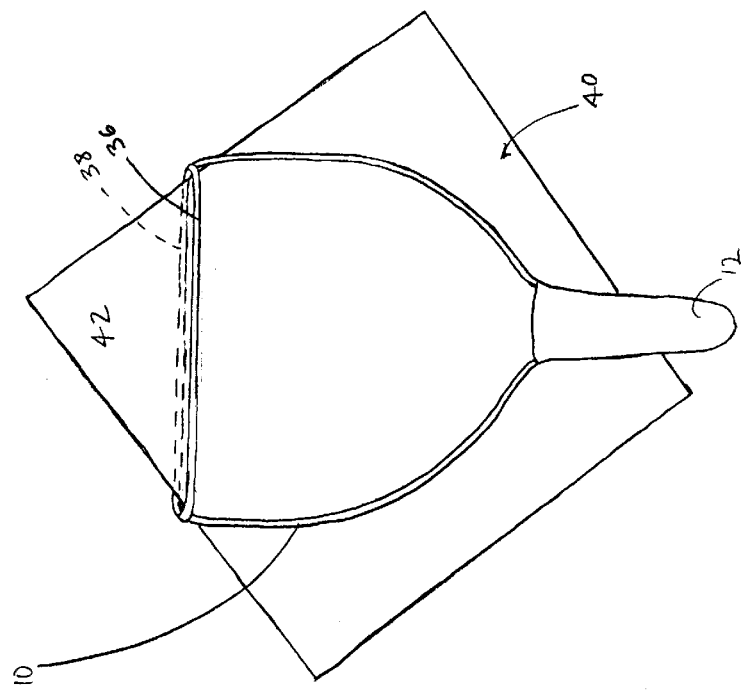
FIG. 3 is a view showing the second step of the process of loading a paper towel onto the canine waste collection device.

FIG. 3 shows the second step of the paper towel 40 being loaded into the appliance 10. The remaining portion 44 is being rotated about the end portion lower portion 38 as indicated generally by arrow A. A first fold line 52 of sorts (best seen in FIG. 7) is formed on the paper towel 40 approximately marking the demarcation of the first portion 42 and the remaining portion 44.

Figure 4:
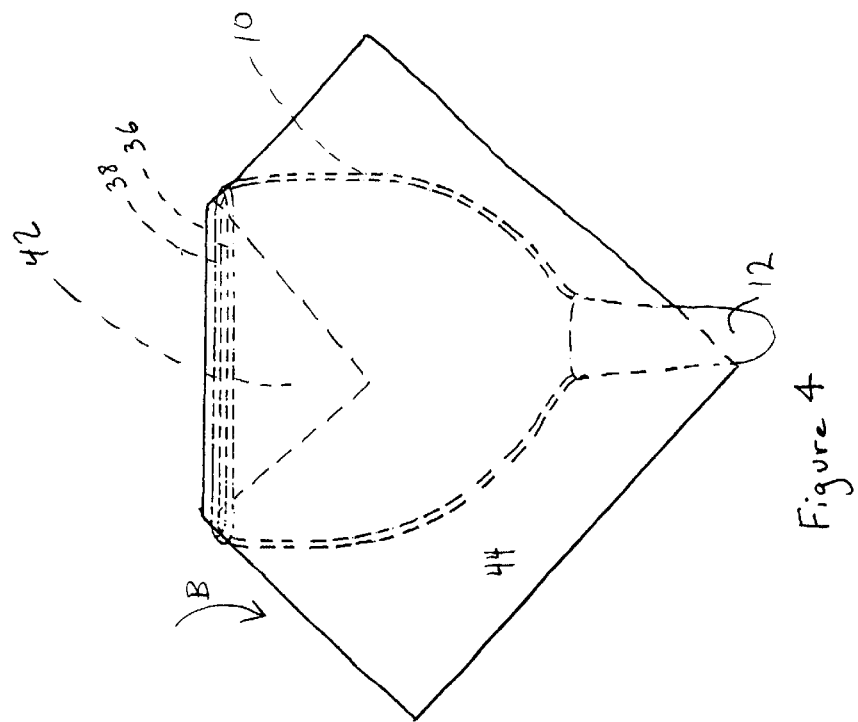
FIG. 4 is a view showing the third step of the process of loading a paper towel onto the canine waste collection device.

FIG. 4 shows the third step of the paper towel 40 being loaded into the appliance 10. The remaining portion 44 is now rotated about both the end portion lower portion 38 and the end portion upper portion 36 as indicated generally by arrow B and then folded atop the appliance 10, obscuring the appliance 10 from view and creating a second fold line 54 of sorts (best seen in FIG. 7). At this step in the loading process, the remaining portion 44 of the paper towel 40 and a portion of the handle 12 is all that can be seen.

Figure 6:
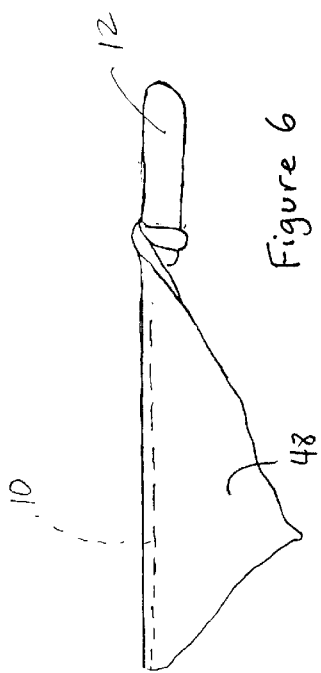
FIG. 6 is a side view showing the paper towel fully loaded on the canine waste collection device.
Figure 5:
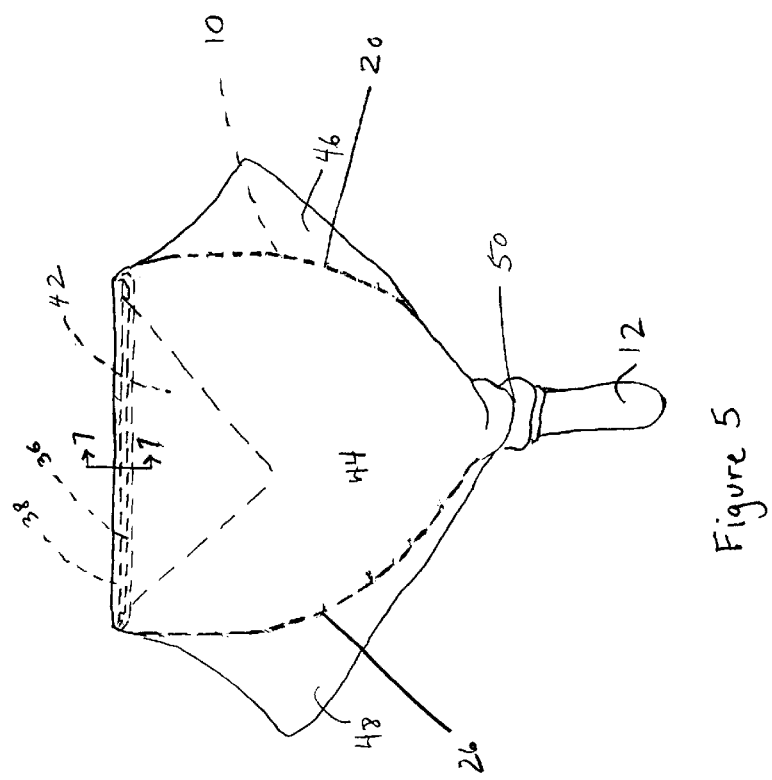
FIG. 5 is a view showing the fourth and final step of the process of loading a paper towel onto the canine waste collection device.

FIG. 5 shows the fourth and final step of loading the paper towel 40 onto the appliance 10. The remaining portion 44 of the paper towel 40 has a second portion 46 which hangs over the right portion 20 of the appliance 10 and a third portion 48 which hangs over the left portion 26 of the appliance 10. A remaining portion 44 of the paper towel 40 has a fourth portion 50 which is generally wrapped about the handle 12 of the appliance 10 proximal the intersection of the handle 12 and the frame 15. FIG. 6 shows a side view showing how the third portion 48 (and second portion 46) hang over the left portion 26 and the right portion 20 of the appliance 10.

Figure 7:
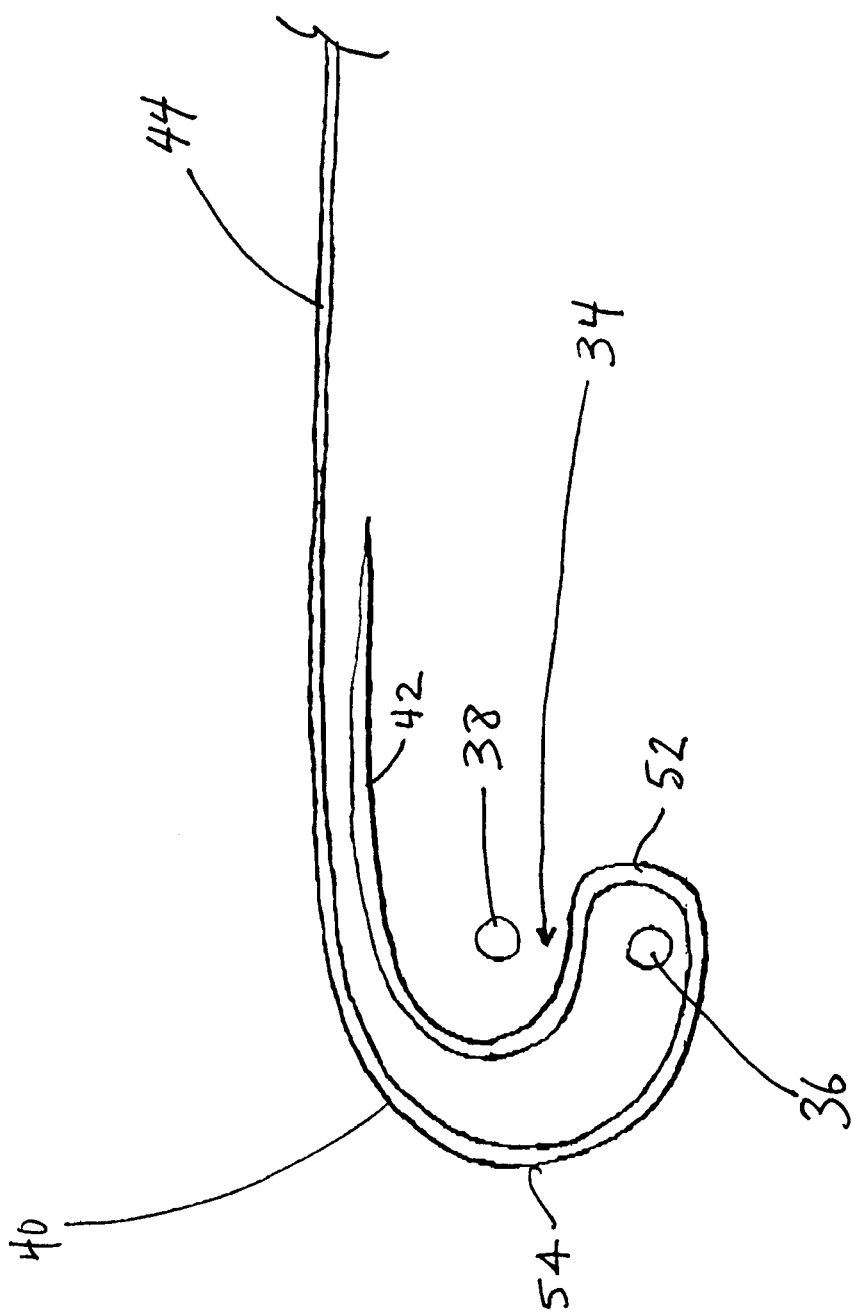
FIG. 7 is a cutaway view taken along line 7—7 of FIG. 5.

FIG. 7 shows a cutaway view along line 7—7 of FIG. 5. Thin slot 34 is located intermediate the end portion lower member 36 and the end portion upper member 38. Paper towel 40 is shown threaded through the thin slot 34 with the general relationship between the first portion 42 and the remaining portion 44. The first fold line 52 and second fold line 54 are shown. By threading the paper towel 40 through the thin slot 34 in the above fashion, the paper towel 40 is essentially locked into the appliance 10. At this point, the appliance 10 is ready for use.

In preparation for defecation, the dog rounds its back then squats and defecates. This is a natural procedure for dogs. Prior to the defecation the appliance 10 is placed on the ground immediately under the appropriate end of the squatting dog. The dog then defecates into the paper towel which has been loaded onto the appliance 10 as discussed above.

The paper towel with the feces located thereon is released from the appliance 10 in the following manner. With the appliance on the floor, the right corner of the paper towel and the left corner of the paper towel are brought together over and about the central area (where the feces is located). Then the third corner of the paper towel which is located about the handle of the appliance is brought into contact with the right corner and the left corner of the paper towel. The first, second and third corners of the paper towel form a pouch with the feces there within. The three corners of the paper towel are raised about 12 inches off the ground. At this point, the appliance will fall downward, and with the other hand, pull the appliance forward and under the pouch. This pulls the remaining corner of the paper towel from the slot on the appliance, releasing the last corner of the paper towel. This fourth corner of the paper towel would then be placed with the other corner elements of the paper towel, and the used towel covering the waste is ready to be disposed. By using this method, the waste is confined to the paper towel without coming into contact with the person using the appliance.

At the point where the paper towel is released from the appliance, it is ready to be disposed. A preferred manner of disposal includes flushing the feces and the used paper towel down a flush toilet. In this case the waste material would be dumped from the paper towel into the toilet bowl followed by the paper towel. The toilet is prevented from clogging by separating the feces from the paper towel.

Other obvious methods of disposing of the waste and the paper towel can be easily seen. The use of trash receptacles, portable non-flushing toilets, outhouses, plastic trash bags etc. may all be used without deviating from the proposed use of the canine waste collection appliance 10.

It is apparent from the above that the present invention accomplishes all of the objectives set forth by providing a a canine waste collection device and disposal method which includes a handle and frame, the frame including means to removably secure a paper towel thereto.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

I claim:

1. A canine waste collection device comprising:
   a handle, said handle having a top portion and a bottom portion,
   a right portion, said right portion having a proximal element and a distal element,
   a left portion, said left portion having a proximal element and a distal element,
   said right portion proximal element and said left portion proximal element connected to said handle bottom portion,
   an end portion, said end portion including a thin slot, said end portion having a right side and a left side,
   said end portion right side connected to said right portion distal element,
   said end portion left side connected to said left portion distal element,
   a paper towel, said paper towel having a first portion received in said thin slot,
   said paper towel folded atop said thin slot, said paper towel having a second portion folded about said right portion, said paper towel having a third portion folded about said left portion, said paper towel having a fourth portion folded about the intersection of said handle with said right portion and said left portion, whereby the canine will defecate on said paper towel, said paper towel will be removed from said slot, said waste will be dumped from said paper towel into the toilet and said paper towel be placed in the toilet, and then be disposed of by flushing the toilet.

2. A canine waste collection device as claimed in claim 1 wherein said handle is perpendicular to said end portion.

3. A canine waste collection device as claimed in claim 2 wherein said thin slot extends substantially the length of said end portion.

4. A canine waste collection device as claimed in claim 3 wherein said paper towel is generally rectangular, having a first side, a second side, a third side and a fourth side, a first corner located at the intersection of said first side with said second side, a second corner located at the intersection of said second side with said third side, a third corner located at the intersection of said third side with said fourth side, and a fourth corner located at the intersection of said fourth side with said first side.

5. A canine waste collection device as claimed in claim 4 wherein said first portion of said paper towel is selected from the group of said first corner, said second corner, said third corner and said fourth corner.

* * * * *